United States Patent [19]

Regitz et al.

[11] Patent Number: 4,568,062
[45] Date of Patent: Feb. 4, 1986

[54] FIRE-RESISTANT GATE VALVE

[75] Inventors: Alfred P. Regitz; Stephen P. Barrett; Charles E. Jennings; Kendall E. Keene, all of Houston; Bashir M. Koleilat; John N. McIntyre, both of Spring; Ronald L. Riess; Michael R. Williams, both of Houston, all of Tex.

[73] Assignee: FMC Corporation, Chicago, Ill.

[21] Appl. No.: 472,445

[22] Filed: Mar. 7, 1983

[51] Int. Cl.⁴ .............................................. F16K 3/00
[52] U.S. Cl. .................................... 251/328; 251/330; 251/363; 137/72
[58] Field of Search ............... 137/72, 74; 251/328, 251/330, 363

[56] References Cited

U.S. PATENT DOCUMENTS

| | | | |
|---|---|---|---|
| 3,006,599 | 10/1961 | Eckert | 251/328 X |
| 3,162,208 | 12/1964 | Curatola | 251/363 X |
| 3,896,835 | 7/1975 | Wicke | 137/72 X |
| 4,029,294 | 6/1977 | McCaskill | 251/330 X |
| 4,208,035 | 7/1980 | Alvarez | 251/328 X |
| 4,214,600 | 7/1980 | Williams | 251/330 X |
| 4,289,157 | 9/1981 | McGee | 137/72 |
| 4,307,745 | 12/1981 | McGee | 251/330 X |
| 4,421,134 | 12/1983 | Broton | 137/72 |
| 4,436,283 | 3/1984 | Shore | 251/330 |

Primary Examiner—Harold W. Weakley
Attorney, Agent, or Firm—Richard B. Megley; W. William Ritt, Jr.

[57] ABSTRACT

A stem-operated fire-resistant gate valve including an improved metal-to-metal stem backseat fusible ring assemblies for facilitating automatic stem backseating at pre-selected temperatures, spring enhancement of the backseating procedure, and an improved metal-to-metal gate seat.

22 Claims, 10 Drawing Figures

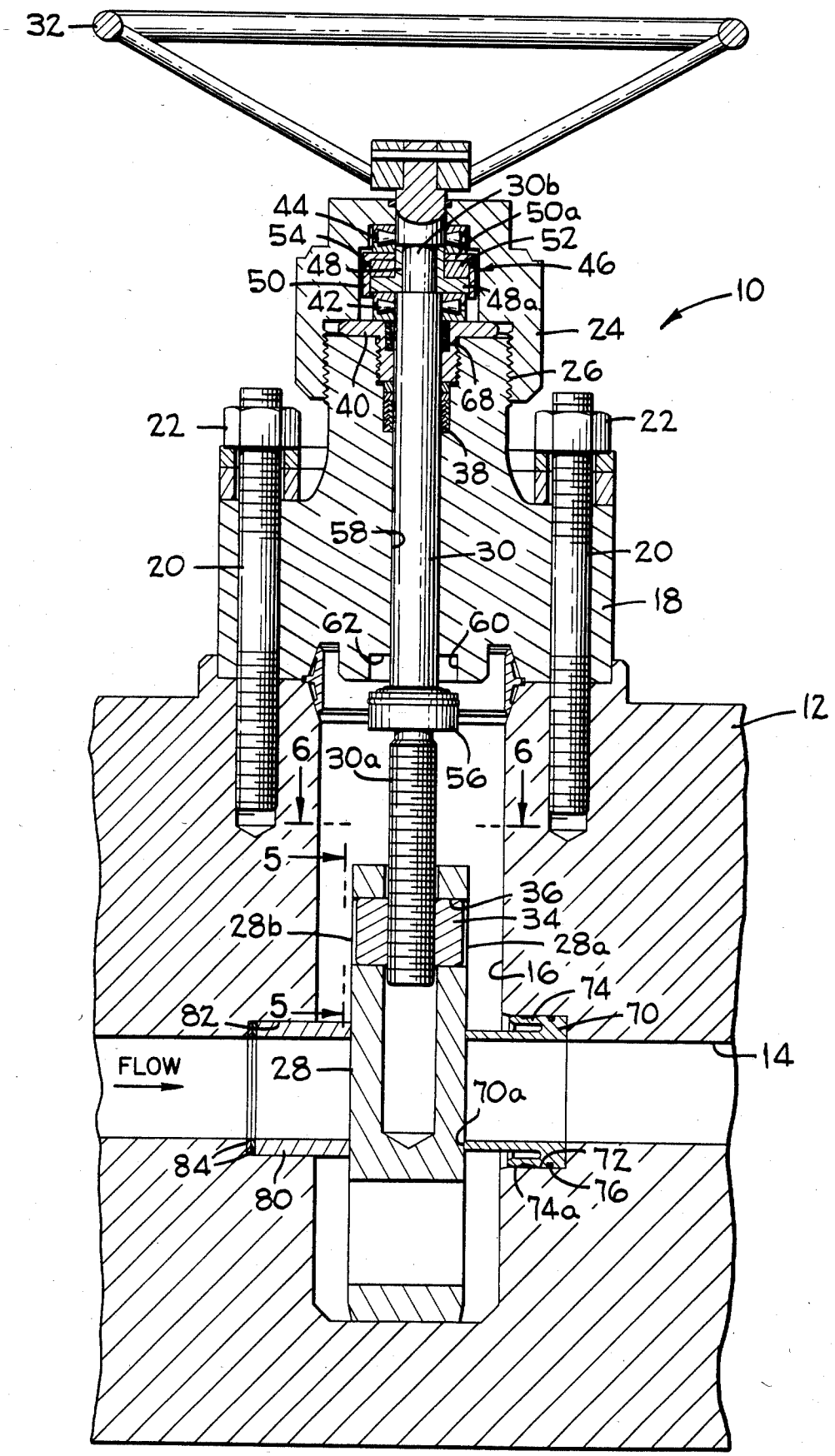
FIG_1

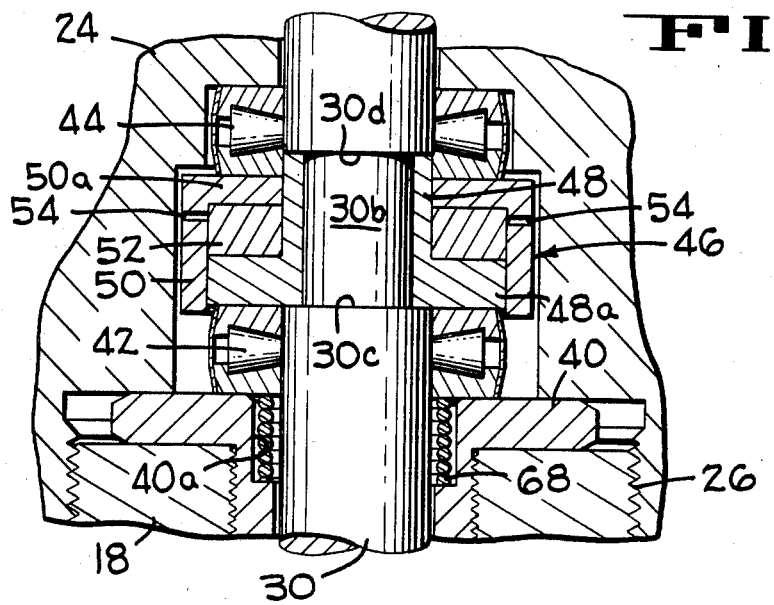
FIG_2
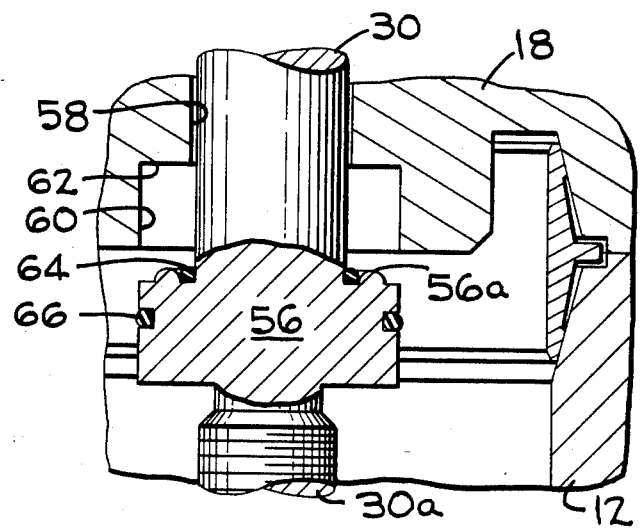
FIG_3
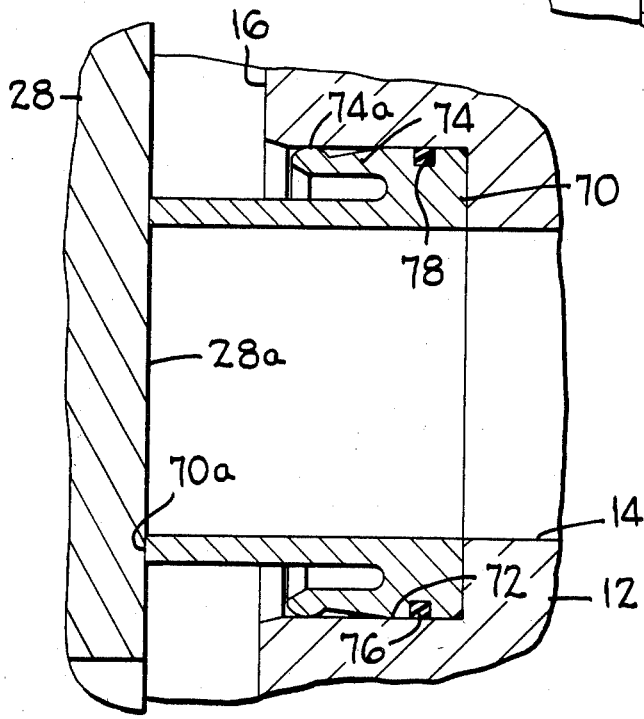
FIG_4

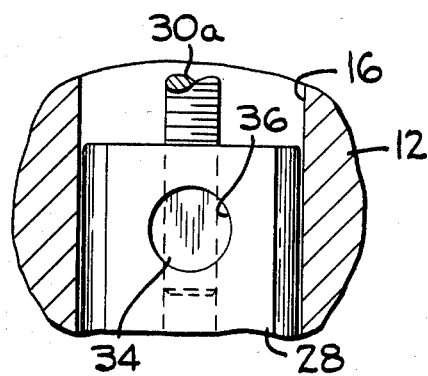
FIG_5
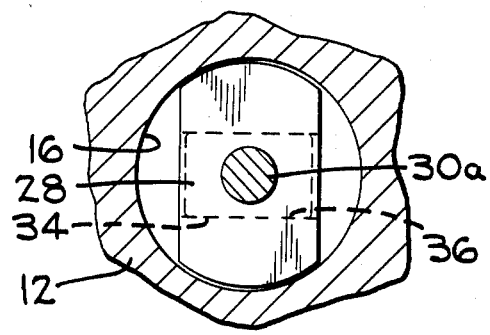
FIG_6
FIG_7
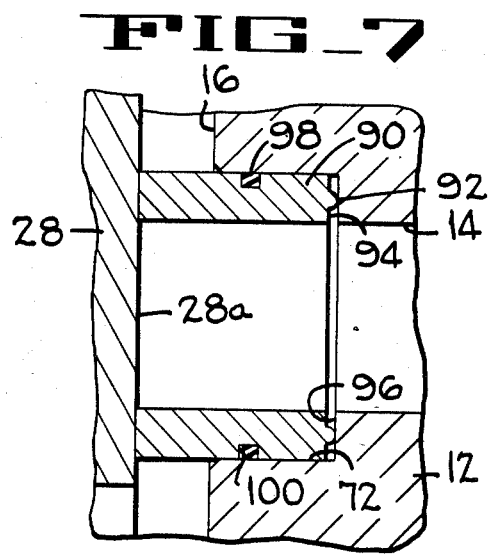
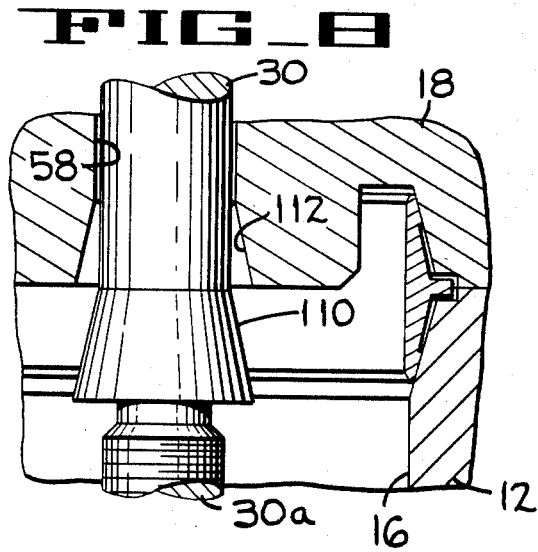
FIG_8
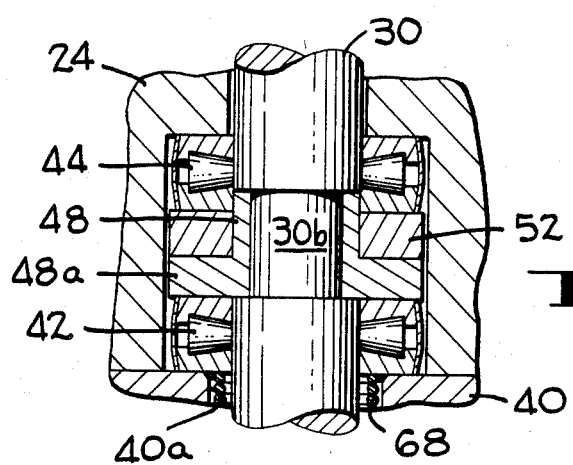
FIG_9

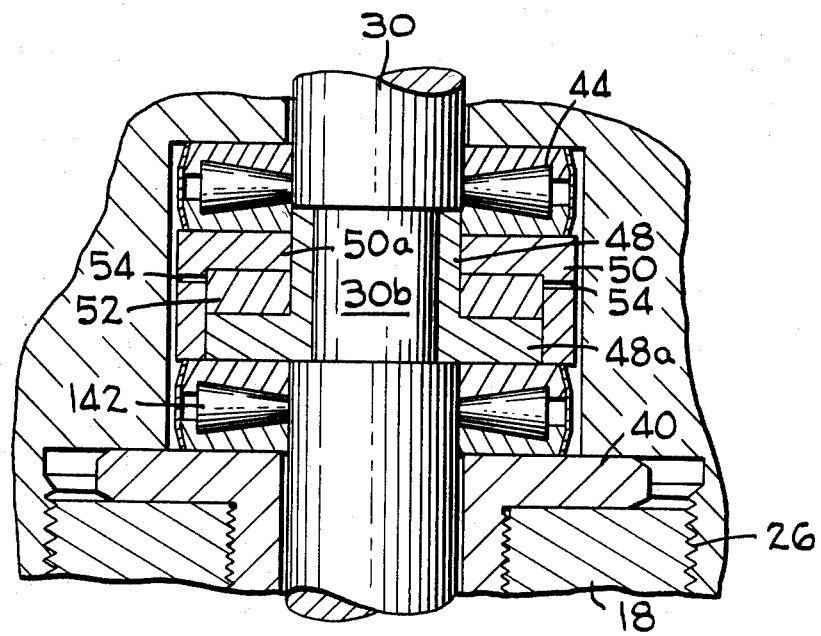
FIG_10

4,568,062

FIRE-RESISTANT GATE VALVE

BACKGROUND OF THE INVENTION

This invention relates to fluid control valves for very high temperature service, and more particularly to gate valves that will contain the operating pressure satisfactorily during and after exposure to a fire.

As reflected in the patent and other literature, much effort has been expended in recent years to provide industry, and especially that involved in oil and gas production, with stem operated valves that will withstand the destructive effects of fire or other high temperatures without losing their function of safe, fluid-tight control of high pressure systems. This effort has resulted in a variety of designs for valves with metal-to-metal seals, stem backseating, and fusible elements to prevent backseating during normal operating temperatures yet facilitate it when such temperatures are exceeded. However meritorious these designs might be, each has one or more disadvantages that prevents total satisfaction of the user.

SUMMARY OF THE INVENTION

The present invention, considered as directed toward overcoming the disadvantages of the known fire-resistant stem operated valves, provides improvements in the location of the fusible element and its functional relationship with the valve stem, stem bearings and bonnet, an improved backseat design for the valve stem, and an improved metal-to-metal sealing system between the valve closure element and valve body.

As incorporated in a non-rising stem gate valve, the present invention comprises, singly or in any combination, a fusible element surrounding a supporting sleeve that is secured to the valve stem in an improved manner, an annular backseat element on the valve stem with an annular metal sealing surface preferably of round cross-sectional configuration, and a seat element with an annular sealing surface of round cross-sectional configuration that establishes a fluid-tight metal-to-metal seal with the valve body.

BRIEF DESCRIPTION OF THE DRAWINGS

FIG. 1 is a view in central vertical section, with some parts in full, of a fire-resistant gate valve embodying features of the present invention.

FIG. 2 is an enlargement of the stem bearing area in the upper portion of FIG. 1.

FIG. 3 is an enlargement of the stem backseat area in the central portion of FIG. 1.

FIG. 4 is an enlargement of the gate seat area in the lower portion of FIG. 1.

FIG. 5 is a view along the line 5—5 of FIG. 1.

FIG. 6 is a view along the line 6—6 of FIG. 1.

FIG. 7 is a view like FIG. 4, but on a reduced scale, showing another form of gate seat with an annular metal sealing surface of round cross-sectional configuration.

FIG. 8 is a view like FIG. 3, showing another configuration of backseat for the valve stem.

FIG. 9 is a view like FIG. 2, but on a reduced scale, illustrating another embodiment of a fusible ring assembly according to the present invention.

FIG. 10 is a view like FIG. 2, showing yet another embodiment of a fusible ring assembly in accordance with the present invention.

DESCRIPTION OF THE PREFERRED EMBODIMENT

As illustrated in FIG. 1, the preferred embodiment of an improved fire-resistant gate valve 10 having features of the present invention comprises a body 12 with a flow passage 14, a valve chamber 16 intersected by the flow passage 14, a valve bonnet 18 releasably secured to the body 12 as by a plurality of circumferentially spaced studs 20 and nuts 22, a bonnet cap 24 secured to the bonnet 18 by threads 26, a valve gate 28 disposed in the chamber 16 to control flow through the passage 14, a valve stem 30 extending from the gate 28 through the bonnet 18 and the cap 24, and a handwheel 32 or other suitable means for rotating the stem 30. The stem 30 is threaded into a lift pin 34 (FIGS. 1, 5 and 6) that resides in a transverse bore 36 through the gate 28, so that as the stem is rotated, the gate is translated between its closed position (illustrated) and its open position in the valve chamber 16 of the body 12. The valve chamber 16 is shown in its preferred embodiment, as a circular cavity but the cavity could be rectangular, square, etc., in cross section. The valve chamber 16 is used to align the valve gate 28 properly. The valve gate 28 would be shaped to conform with the valve chamber 16, circular, rectangular, square, etc.

Near the upper end of the bonnet 18 is an annular packing 38 that provides a fluid seal between the bonnet and the stem 30, and a gland-type packing nut 40, threaded into the bonnet, serves as a retainer for the packing. Above the packing nut 40 the stem 30 is surrounded by a pair of thrust bearing assemblies 42,44 that facilitate easy rotation of the stem to open and/or close the valve.

Between the bearing assemblies 42, 44 is a fusible ring assembly 46 (FIGS. 1 & 2) that axially supports the stem 30 in its illustrated position during normal operating temperatures. The assembly 46 comprises an axially-split sleeve 48 with an annular radial flange 48a extending outwardly from its lower end, a retaining ring 50 with an annular radial flange 50a extending inwardly from its upper end, and a fusible ring 52 sandwiched between the flanges 48a,50a. The sleeve 48 is formed by two equal half-round segments (only one shown) that fit around a reduced diameter stem portion 30b (seen best in FIG. 2) and between opposed annular shoulders 30c,30d. The retaining ring 50 freely surrounds the sleeve 48 and the fusible ring 52, and has one or more lateral ports 54 through which material of the ring 52 can exit after being melted by a fire or other sufficiently elevated temperature.

As seen best in FIG. 3, extending radially outwardly from the stem 30 below the bonnet 18 and above the stem's threaded portion 30a is an annular backseat flange 56 with an upwardly facing annular metallic sealing surface 56a of round cross-sectional configuration. The lower portion of the bonnet bore 58 is counterbored at 60 to provide an annular radial surface 62 that functions as a seat for the sealing surface 56a. The backseat flange 56 also can be provided with O-rings 64,66 to function as sealing elements between the flange and the bonnet 18 at normal temperatures.

When the fusible ring 52 melts, as in response to exposure of the valve 10 to a fire or other sufficiently high temperature, the fluid pressure in the valve body forces the stem 30 upwardly until the sealing surface 56a of the stem flange 56 comes to rest against the bonnet seat surface 62, thereby effecting a metal-to-metal backseat of the stem on the bonnet and preventing escape of fluid through the bonnet bore 58. As the foregoing occurs, the split sleeve 48 is carried upwardly with the stem 30.

In order that positive stem backseating can be achieved, even at relatively low valve pressures, a helical spring 68 (seen best in FIG. 2), residing in a counterbore 40a in the upper portion of the packing nut 40 and compressed between the nut and the bearing assembly 42, is included to move that bearing assembly, and thus also the split sleeve 48 and the stem 30, upwardly when the fusible ring 52 melts.

As illustrated in FIGS. 1 and 4, the downstream side 28a of the valve gate 28 is sealed in fluid-tight manner to the valve body 12 by a seat comprising a uniquely-shaped sleeve-like metal seat element 70 residing in a counterbore 72 in the body flow passage 14. The seat element 70 includes an annular sealing lip 74 with a sealing surface 74a of round cross-sectional configuration. Before installation, the outside diameter of the sealing surface 74a is slightly greater than the diameter of the counterbore 72 so that when the element 70 is installed in functional position the sealing surface presses against the counterbore to provide a metal-to-metal seal between the element 70 and the valve body 12. An O-ring 76, carried in an external groove 78 in the element 70, can be included to prevent pressure at normal operating temperatures from migrating from the flow passage 14 and between the element 70 and the counterbore 72 to the lip 74.

On the upstream side 28b of the gate 28 another sleeve-like seat element 80 (FIG. 1), residing in a counterbore 82 in the flow passage 14, is biased against the gate by one or more belleville springs 84 (two shown), and this axial load also produces an initial seal between the downstream side 28a of the gate 28 and the upstream end 70a of the element 70.

FIG. 7

Another version of the downstream seat element embodying the present invention is shown as 90 in FIG. 7. The sleeve-like element 90 has an annular sealing surface 92 of round cross-sectional configuration on its downstream radial end surface 94, and this sealing surface bears against and cooperates with an opposed radial surface 96 in the valve body counterbore 72 to provide a fliud-tight metal-to-metal seal between the valve body 12 and the element 90. Additional sealing capability at normal temperatures and low pressures can be obtained by including an O-ring 98 in a circumferential groove 100 on the outer surface of the element 90.

FIG. 8

An alternate backseat design for the valve stem 30 is illustrated in FIG. 8, this design comprising a frusto-conical enlarged portion 110 of the stem above its threaded portion 30a, and a complementary beveled inlet 112 to the bonnet bore 58. The beveled inlet 112 functions as a seat for the frusto-conical stem portion 110, so that when the fusible ring 52 melts the stem 30 will rise until the stem portion 110 comes to rest against the beveled inlet, thereby providing a fluid-tight metal-to-metal seal between the stem and the bonnet.

FIG. 9

FIG. 9 illustrates a modified embodiment of the fusible ring assembly 46. In this embodiment there is no retainer ring, such as that at 50 in FIGS. 1 and 2, and the fusible ring 52 is in direct contact with the upper bearing assembly 44.

FIG. 10

Another modified embodiment of fusible ring assembly is illustrated in FIG. 10. In this embodiment, the lower bearing assembly 142 has a significantly larger outside diameter than its counterpart 42 (FIGS. 1 and 2) and underlies the lower end of the retainer ring 50. Accordingly, in the FIG. 10 embodiment the fusible ring 52 provides no support function to either of the bearing assemblies 142,44, and when this fusible ring melts the stem 30 and the split sleeve 48 rise until the stem backseats on the bonnet, but the lower bearing assembly 142 remains in its illustrated position.

Although the best mode contemplated for carrying out the present invention has been herein shown and described, it will be apparent that modification and variation may be made without departing from what is regarded to be the subject matter of the invention.

We claim:

1. A valve comprising a body with a metallic surface flow passage extending therethrough and a chamber intersected by said flow passage;
    a valve closure element position in said chamber to control flow through said flow passage;
    a bonnet secured to said body and having a bore communicating with said chamber;
    a valve stem extending through said bore and connected to said closure member; and
    means for providing a fluid-tight seal between said body and said valve closure element, said seal means comprising a one-piece sleeve-like seat having a central longitudinal axis, said seat positioned in said flow passage and extending into contact with said valve closure element, said seat having as a portion thereof an annular metallic ridge-like sealing surface of round cross-sectional configuration, said cross-section taken with respect to said central longitudinal axis, said metallic sealing surface pressing against the surface of said flow passage to form a fluid-tight metal-to-metal seal therewith.

2. A valve according to claim 1 wherein said sealing surface forms a seal with an axial surface of said flow passage.

3. A valve according to claim 2 wherein said annular sealing surface resides on an annular lip-like portion of said seat, and wherein the unrestrained diameter of said sealing surface is greater than the diameter of said flow passage surface against which said seal is formed.

4. A valve according to claim 1 wherein said sealing surface forms a seal with a radial surface of said flow passage.

5. A valve according to claim 4 including spring means biasing said sealing surface against said radial surface.

6. A valve according to claim 1 including means for backseating said stem on said bonnet in response to axial movement of said stem with respect to said bonnet.

7. A valve according to claim 6 wherein said backseating means comprises an annular radial flange on said stem with an axially facing annular ridge-like sealing surface of rounded axial cross-sectional configuration, and an annular flat radial seat on said bonnet that cooperates with said sealing surface to establish a fluid-tight seal.

8. A valve according to claim 6 including fusible means for retaining said stem in unbackseated condition.

9. A valve according to claim 8 wherein said fusible means comprises a ring of fusible material and a sleeve with an outwardly extending radial flange, said sleeve surrounding and secured to said stem for unitary axial movement therewith, said ring surrounding said sleeve adjacent said flange, and a retaining ring surrounding said stem and cooperating with said sleeve to sandwich said fusible ring therebetween.

10. A valve comprising a body with a flow passage extending therethrough and a chamber intersected by said flow passage;
- a valve closure element positioned in said chamber to control flow through said flow passage;
- a bonnet secured to said body and having a bore communicating with said chamber;
- a valve stem extending through said bore and connected to said closure element;
- means for backseating said stem on said bonnet in response to axial movement of said stem with respect to said bonnet;
- fusible means for said stem in unbackseated condition, said fusible means comprising a ring of fusible material and a support sleeve surrounded by and supportive of said ring, said support sleeve including an outwardly extending radial flange upon which said ring is supported, said support sleeve surrounding and secured to said stem for unitary axial movement therewith;
- first bearing means surrounding said stem above said fusible ring, said bearing means cooperating with said ring and said bonnet to prevent axial movement of said stem; and
- a retaining ring surrounding said stem, said retaining ring including an annular radial flange between said first bearing means and said fusible ring, whereby said fusible ring cooperates with said bonnet to prevent said unitary axial movement until melting of said fusible ring has occurred.

11. A valve according to claim 10 including second bearing means surrounding said stem below said fusible ring.

12. A valve according to claim 11 wherein said retaining ring extends axially between said first and second bearing means and provides axial support therebetween.

13. A valve according to claim 11 wherein the inside diameter of said retaining ring is greater than the outside diameter of said second bearing means.

14. A valve according to claim 10 wherein said support sleeve and said retaining ring cooperate to substantially enclose said fusible ring.

15. A valve according to claim 10 wherein said support sleeve comprises two substantially identical half-round components.

16. A valve according to claim 10 including spring means biasing said stem in an axial direction away from said chamber.

17. A valve according to claim 10 wherein said backseating means comprises an annular radial flange on said stem with an axially facing annular ridge-like sealing surface of rounded axial cross-sectional configuration, and an annular flat radial seat on said bonnet that cooperates with said sealing surface to establish a fluid-tight seal between said stem and said bonnet.

18. A valve according to claim 17 wherein said sealing surface and said seat are metal.

19. A valve according to claim 10 including means for providing a fluid-tight seal between said body and said valve closure element.

20. A valve according to claim 19 wherein said seal means comprises a sleeve-like metal seat extending between said flow passage and said closure element, said seat having an annular ridge-like sealing surface with a rounded configuration in axial cross-section.

21. A valve according to claim 20 wherein said ridge-like sealing surface extends axially from an end of said seat.

22. A valve according to claim 20 wherein said seat includes a relatively flexible axially-oriented annular lip, and wherein said ridge-like sealing surface extends radially from said lip.

* * * * *